US012675293B2

(12) United States Patent (10) Patent No.: US 12,675,293 B2
Zhang et al. (45) Date of Patent: Jul. 7, 2026

(54) PROCESSOR, METHOD, AND SYSTEM FOR ACCELERATING TENSOR TRANSPOSE FOR MACHINE LEARNING

(71) Applicant: MOFFETT INTERNATIONAL CO., LIMITED, Kowloon (HK)

(72) Inventors: Changxu Zhang, Los Altos, CA (US);
Zhibin Xiao, Los Altos, CA (US);
Enxu Yan, Los Altos, CA (US);
Xiaoqian Zhang, Los Altos, CA (US);
Renjie Chen, Los Altos, CA (US)

(73) Assignee: Moffett International Co., Limited,
Kowloon (HK)

( * ) Notice: Subject to any disclaimer, the term of this patent is extended or adjusted under 35 U.S.C. 154(b) by 0 days.

(21) Appl. No.: 18/798,035

(22) Filed: Aug. 8, 2024

(65) Prior Publication Data

US 2026/0044346 A1     Feb. 12, 2026

(51) Int. Cl.
G06F 9/30 (2018.01)
(52) U.S. Cl.
CPC ........ G06F 9/3016 (2013.01); G06F 9/30043 (2013.01)
(58) Field of Classification Search
CPC ............. G06F 9/30032; G06F 9/30036; G06F 9/30038; G06F 7/78; G06F 12/0207; G06F 17/16
See application file for complete search history.

(56) References Cited

U.S. PATENT DOCUMENTS

| | | | |
|---|---|---|---|
| 4,918,527 A | 4/1990 | Penard et al. | |
| 10,872,038 B1 | 12/2020 | Nair et al. | |
| 2002/0032710 A1* | 3/2002 | Saulsbury | G06F 17/16 |
| | | | 712/E9.034 |
| 2003/0043639 A1* | 3/2003 | Dupont | G06F 5/065 |
| | | | 365/189.05 |
| 2009/0300091 A1 | 12/2009 | Brokenshire et al. | |

(Continued)

OTHER PUBLICATIONS

Yen, Ian En-Hsu, Zhibin Xiao and Dongkuan Xu. "S4: a High-sparsity, High-performance AI Accelerator." ArXiv (Year: 2022).*

(Continued)

*Primary Examiner* — Jyoti Mehta
*Assistant Examiner* — Kasim Alli
(74) *Attorney, Agent, or Firm* — Sheppard Mullin Richter & Hampton LLP

(57) ABSTRACT

The present invention relates to a processor designed to optimize memory bandwidth utilization for tensor transpositions in machine learning. It features an instruction decoder that decodes tensor transpose instructions for an input tensor, distinguishing between transposing and stationary axes. An inner transpose engine, equipped with multiple tensor buffer units of varying sizes, transposes the tensor by reading data by rows and writing by columns, efficiently managing memory when the buffer is full. Additionally, an address scheduler determines the target memory addresses in the output tensor memory for the tensor data, improving the handling and transformation of tensors in machine learning environments. This processor significantly enhances the efficiency and speed of tensor operations critical to advanced machine learning applications.

20 Claims, 12 Drawing Sheets

(56) References Cited

U.S. PATENT DOCUMENTS

| 2012/0106287 | A1 |  | 5/2012 | Catovic et al. |
|---|---|---|---|---|
| 2018/0188972 | A1 |  | 7/2018 | Yang et al. |
| 2018/0189227 | A1 | * | 7/2018 | Korthikanti ............. G06F 17/16 |
| 2019/0042248 | A1 | * | 2/2019 | Bradford ............. G06F 9/30109 |
| 2021/0406686 | A1 | * | 12/2021 | Xiao .................... G06N 3/0495 |
| 2022/0172059 | A1 | * | 6/2022 | Yan ........................ G06N 3/082 |
| 2022/0405348 | A1 | * | 12/2022 | Lichtenau .............. G06N 3/063 |
| 2023/0176981 | A1 |  | 6/2023 | Wei et al. |
| 2023/0214236 | A1 | * | 7/2023 | Mansell .............. G06F 9/30141 |
|  |  |  |  | 708/190 |
| 2024/0264948 | A1 |  | 8/2024 | Trivedi et al. |
| 2024/0345903 | A1 | * | 10/2024 | Brothers, III ....... G06F 9/30036 |
| 2025/0217149 | A1 | * | 7/2025 | Pillai .................. G06F 9/30036 |

OTHER PUBLICATIONS

Moffett Al, "Introduction to Sparse Computing Whitepaper" (Year: 2022).*

Non-Final Office Action dated Nov. 5, 2025, issued in U.S. Appl. No. 18/812,278 (20 pages).

\* cited by examiner

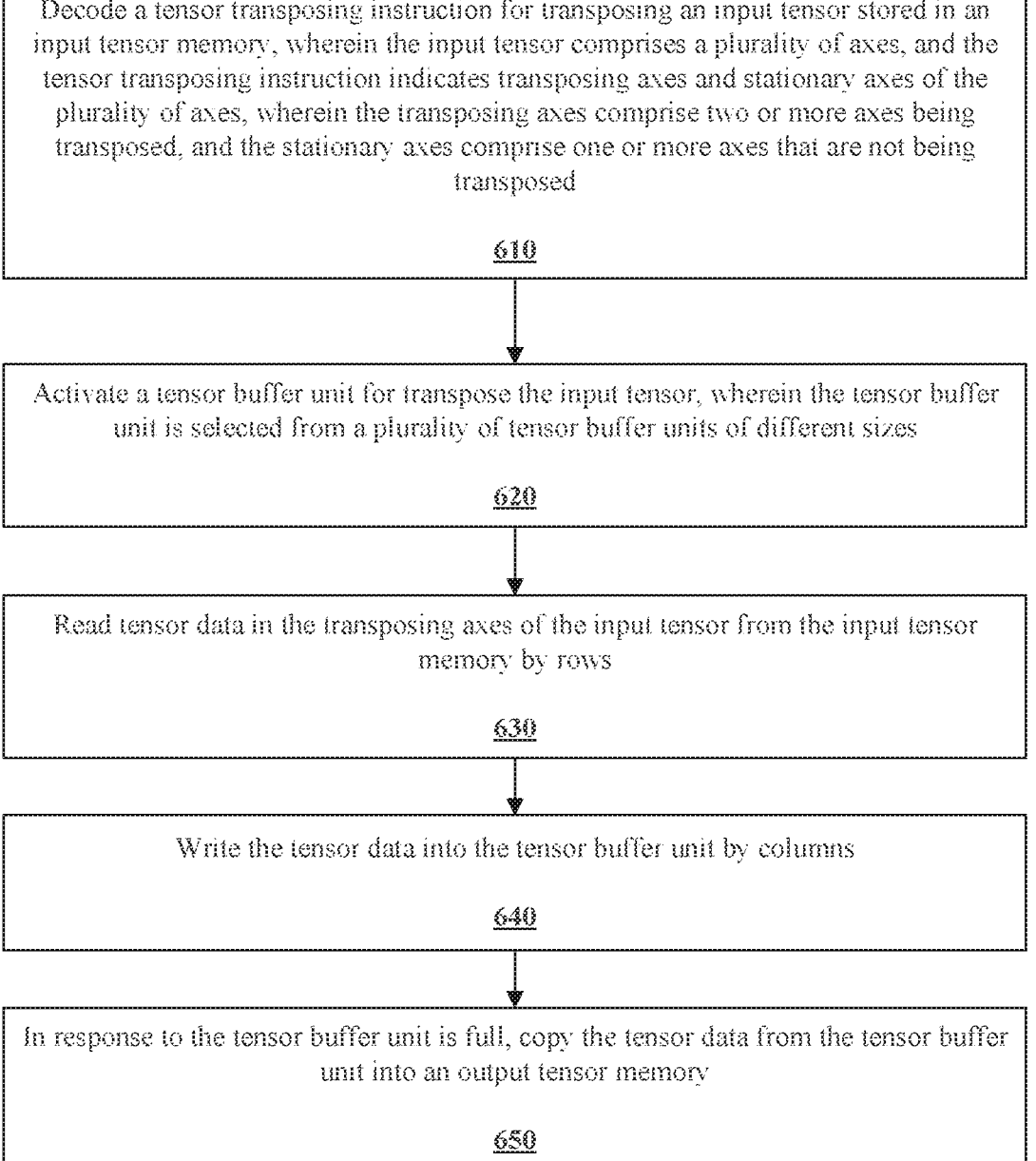

Decode a tensor transposing instruction for transposing an input tensor stored in an input tensor memory, wherein the input tensor comprises a plurality of axes, and the tensor transposing instruction indicates transposing axes and stationary axes of the plurality of axes, wherein the transposing axes comprise two or more axes being transposed, and the stationary axes comprise one or more axes that are not being transposed

610

Activate a tensor buffer unit for transpose the input tensor, wherein the tensor buffer unit is selected from a plurality of tensor buffer units of different sizes

620

Read tensor data in the transposing axes of the input tensor from the input tensor memory by rows

630

Write the tensor data into the tensor buffer unit by columns

640

In response to the tensor buffer unit is full, copy the tensor data from the tensor buffer unit into an output tensor memory

PROCESSOR, METHOD, AND SYSTEM FOR ACCELERATING TENSOR TRANSPOSE FOR MACHINE LEARNING

TECHNICAL FIELD

The disclosure generally relates to a hardware design for accelerating tensor transposition in machine learning models, in particular, a processor with built-in tensor transposition support for neural networks (NN).

BACKGROUND

In the realm of machine learning and deep learning, tensor transposition is pivotal for data manipulation, playing a vital role in the preprocessing, data augmentation, and adaptation of data to fit neural network architectures. This process, which entails the rearrangement of multidimensional tensor dimensions, is critical for enhancing the training and inference efficiency of models. However, the computational infrastructure, including Central Processing Unit (CPUs) and Graphic Processing Unit (GPUs), currently falls short in efficiently addressing the intricate memory access and reshuffling demands that tensor transposition introduces.

This deficiency in hardware capability leads to significant inefficiencies, particularly as the complexity and dimensionality of tensors grow. The inability of hardware to adeptly handle the non-linear data access patterns required for tensor transposition results in less-than-optimal use of cache memory and an escalation in memory bandwidth needs. Such inefficiencies not only slow down the computational process but also widen the disconnect between existing hardware designs and the sophisticated requirements of contemporary machine learning tasks.

SUMMARY

Various embodiments of the present specification may include processors and systems for improving the memory access efficiency during tensor transposition operations.

In one general aspect, an example processor may include an instruction decoder configured to decode a tensor transpose instruction for transposing an input tensor stored in an input tensor memory, where: the input tensor may include a plurality of axes, and the tensor transpose instruction indicates transposing axes and stationary axes of the plurality of axes, where the transposing axes may include two or more axes being transposed, and the stationary axes may include one or more axes that are not being transposed.

The processor may also include an inner transpose engine configured to: provide a plurality of tensor buffer units of different sizes; activate a tensor buffer unit of the plurality of tensor buffer units; read tensor data in the transposing axes of the input tensor from the input tensor memory by rows; write the tensor data into the activated tensor buffer unit by columns; and in response to the tensor buffer unit is full, copy the tensor data from the activated tensor buffer unit into an output tensor memory.

The processor may furthermore include an address scheduler configured to: determine target memory addresses in the output tensor memory for writing tensor data from the stationary axes of the input tensor into the output tensor memory. Other embodiments of this aspect include corresponding computer systems, apparatus, and computer programs recorded on one or more computer storage devices, each configured to perform the actions of the methods.

Implementations may include one or more of the following features. In some embodiments, the input tensor is segmented into a plurality of sub-tensors based on the tensor buffer unit, and each of the sub-tensors has a same size as the activated tensor buffer unit.

In some embodiments, the input tensor may include a channel dimension divided into a plurality of channel groups, each channel group having a plurality of channels, where tensor data in each channel group is stored sequentially in the input tensor memory.

In some embodiments, to activate one of the plurality of tensor buffer units to transpose the input tensor, the inner transpose engine is further configured to: select the tensor buffer unit based on a size of the channel group of the input tensor, where the tensor buffer unit has a most-inner dimension of a same size as the size of the channel group of the input tensor; and activate the selected tensor buffer unit.

In some embodiments, to activate one of the plurality of tensor buffer units to transpose the input tensor, the inner transpose engine is further configured to: in response to that none of the plurality of tensor buffer units has an inner-most dimension matching a size of a channel group dimension of the input tensor, select an approximate tensor buffer unit that has a smallest inner-most dimension that is greater than the size of the channel group dimension of the input tensor.

In some embodiments, to activate one of the plurality of tensor buffer units to transpose the input tensor, the inner transpose engine is further configured to: apply tensor masks to the approximate tensor buffer unit to obtain a masked tensor buffer unit, such that the masked tensor buffer unit has the inner-most dimension of the same size as the size of the channel group dimension of the input tensor; and activate the masked tensor buffer unit.

In some embodiments, the input tensor memory has a maximum memory bandwidth, and each of the plurality of tensor buffer units may include a plurality of axes, and a product of two most-inner axes of the plurality of axes equals to the maximum memory bandwidth of the input tensor memory.

In some embodiments, each of the plurality of tensor buffer units may include a first axis, a second axis, and a third axis, where the first axis equals to the second axis, and the third axis represents a channel group dimension that is smaller than a maximum memory bandwidth of the input tensor memory.

In some embodiments, to read the tensor data from the transposing axes of the input tensor from the input tensor memory by rows, the inner transpose engine is further configured to: determine a continuous unit in the input tensor for transposing, where the continuous unit may include a longest vector of tensor data that is sequentially stored in the input tensor memory.

In some embodiments, the input tensor memory has a maximum memory bandwidth, and to read the tensor data from the transposing axes of the input tensor from the input tensor memory by rows and write the tensor data into the tensor buffer unit by columns, the inner transpose engine is further configured to: read a first plurality of continuous units in a row of the input tensor to fulfill the maximum memory bandwidth of the input tensor memory; write the first plurality of continuous units from the row of the input tensor into a column of the tensor buffer unit; move to a next row of the input tensor and read a second plurality of continuous unit in the next row to fulfill the maximum memory bandwidth of the input tensor memory; and write the second plurality of continuous units from the next row of the input tensor into a next column of the tensor buffer unit.

In some embodiments, to copy the tensor data from the tensor buffer unit into the output tensor memory, the inner transpose engine is further configured to: in response to that the tensor buffer unit is full, start copying the tensor data from the tensor buffer unit into the output tensor memory without transposing. Implementations of the described techniques may include hardware, a method or process, or a computer tangible medium.

In one general aspect, an example method may include decoding a tensor transpose instruction for transposing an input tensor stored in an input tensor memory, where the input tensor may include a plurality of axes, and the tensor transpose instruction indicates transposing axes and stationary axes of the plurality of axes, where the transposing axes may include two or more axes being transposed, and the stationary axes may include one or more axes that are not being transposed. The method may also include activating a tensor buffer unit for transpose the input tensor, where the tensor buffer unit is selected from a plurality of tensor buffer units of different sizes. The method may furthermore include reading tensor data in the transposing axes of the input tensor from the input tensor memory by rows. The method may in addition include writing the tensor data into the tensor buffer unit by columns. The method may moreover include in response to the tensor buffer unit is full, copying the tensor data from the tensor buffer unit into an output tensor memory. Other embodiments of this aspect include corresponding computer systems, apparatus, and computer programs recorded on one or more computer storage devices, each configured to perform the actions of the methods.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 6 illustrates an exemplary method of tensor transposition using the tensor transpose processor, in accordance with various embodiments.

DETAILED DESCRIPTION

The concept of transposing extends beyond two-dimensional matrices to tensors, which are multidimensional arrays of numbers. Tensors are fundamental in various scientific fields, including physics, computer science, and engineering. A tensor's dimensions are often referred to as "axes" or "modes." While the transpose of a two-dimensional matrix involves flipping elements across its main diagonal, transposing a tensor with more than two dimensions involves rearranging these dimensions, a process which can significantly alter the tensor's structure and the relationship between its elements.

Figure 1A:
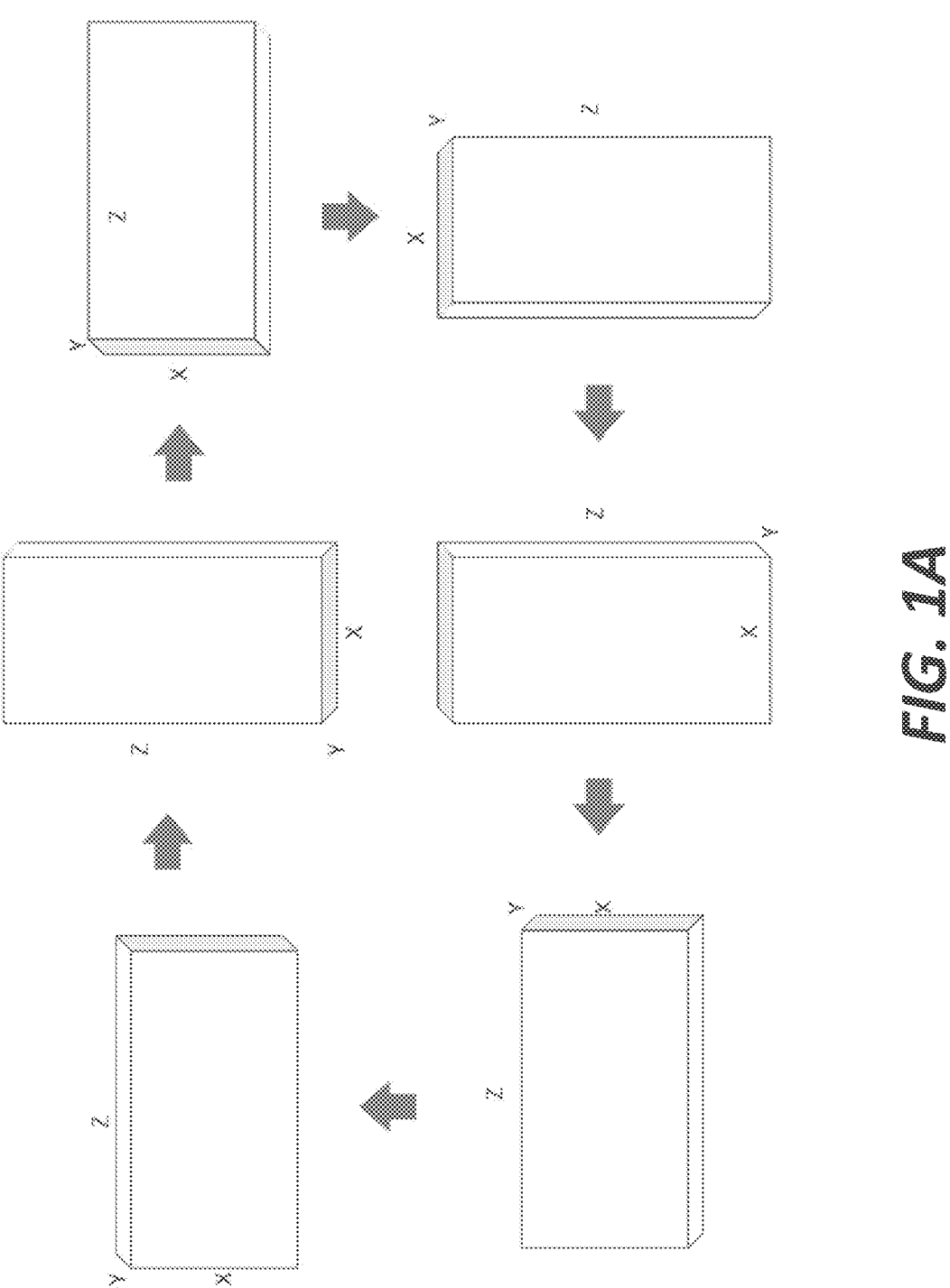
FIG. 1A illustrates an example tensor transposition in machine learning.

Transposition of a higher-dimensional tensor is defined by specifying a permutation of its dimensions. FIG. 1A illustrates an example tensor transposition in machine learning. The multi-dimensional tensor illustrated in FIG. 1A has three dimensions represented by (X,Y,Z), where X, Y, and Z denote the size of the tensor along each axis. In practice, each dimension X, Y, or Z may include more than one dimensions, meaning the multi-dimensional tensor could be more than three dimensions as illustrated in FIG. 1A.

Transposing the tensor in FIG. 1A might involve permuting these dimensions to (Z,X,Y), (Y,Z,X), or any other permutation, depending on the specific requirements of the operation being performed. This permutation changes how elements are indexed and accessed, effectively reshuffling the tensor's data.

The importance of tensor transposition is pronounced in fields like deep learning and computer graphics, where tensors are used to represent complex datasets such as images, videos, and multidimensional signal data. In these applications, transposing a tensor can be crucial for aligning data in a format expected by specific algorithms, for optimizing memory layout for faster computation, or for visualizing multidimensional data in a more interpretable manner.

One common application involves the transposition of a tensor representing an image. In computer memory, an image is often stored as a 3D tensor with dimensions corresponding to height, width, and color channels (e.g., RGB). Depending on the processing requirements, it may be necessary to transpose this tensor to align with the input format expected by image processing libraries or machine learning models, which might expect the color channels to be the first dimension rather than the last.

The flexibility in reordering the dimensions of a tensor during transposition allows for a versatile manipulation of multidimensional data, enabling more efficient data processing, analysis, and visualization. The specific manner in which tensor dimensions are permuted during transposition depends on the application's requirements, highlighting the operation's adaptability and broad utility across different scientific and engineering disciplines.

Figure 1B:
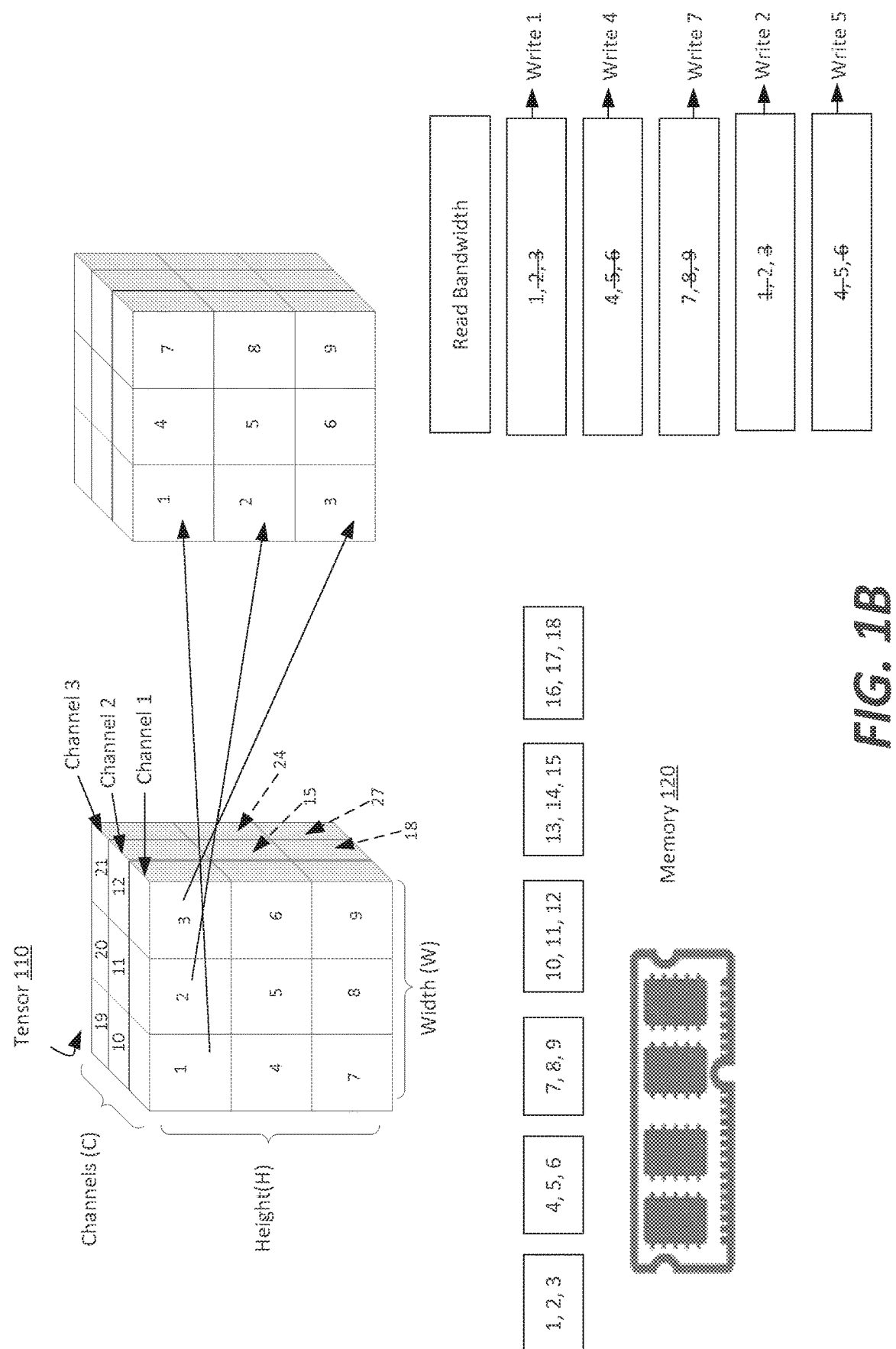
FIG. 1B illustrates the inefficient memory bandwidth utilization of existing processors for tensor transposition.

FIG. 1B illustrates the inefficient memory bandwidth utilization of existing processors for tensor transposition. As mentioned above, tensor transposition involves reordering the multi-dimensional tensors used widely in machine learning applications. When transposing tensors, traditional computing systems access memory by jumping to specific source addresses to fetch the required data segments and write to specific destination memory addresses directly. This process is inherently slow due to the non-sequential memory access patterns that arise when the axes of tensors are transposed. In the worst case, this might result in fetching only a single byte of effective data in each memory read cycle, leading to extremely low efficiency.

A naive approach to addressing this inefficiency is to increase the memory bandwidth, which allows the system to read as much data as possible in each cycle. However, this solution does not scale well with varying tensor transpositions, which may involve a large number of axes and each axis may have a large size. Since the tensor data is pre-stored in memory, transposing based on different axes results in varied and unpredictable memory access patterns. This variation makes it challenging to anticipate the amount of vector data needed for each transposition operation. Unless the entire tensor can be loaded into the cache simultaneously—which is impractical for large tensors—there will inevitably be inefficient reads during each cycle.

To illustrate, consider a scenario where a three-dimensional tensor [a, b, c] of size [64, 128, 512] bytes is stored such that every 512 bytes (the most-inner dimension) are stored sequentially in a memory with bandwidth of 512 bytes/cycle. If this tensor [a, b, c] is transposed to [b, a, c]—retaining the sequence of the inner-most dimension (called stationary axe) and transposing the two outer dimensions (a and b, called transposing axes)—the memory access pattern remains relatively efficient, allowing for the movement of 512 bytes of data per cycle. Here, the large, sequentially stored sections of data can be read in blocks, maximizing throughput.

However, if the inner-most dimension is not the largest, as in a tensor [a, b, c] sized [64, 128, 64] bytes transposed to [b, a, c] (i.e., swapping a dimension and b dimension), the most efficient bandwidth drops to 64 bytes per read cycle. This smaller bandwidth significantly reduces the throughput compared to the first example (i.e., only 64/512, or ⅛ of the memory bandwidth is effectively utilized).

The problem exacerbates further if the transposition involves the two most-inner dimensions, like transposing [a, b, c] sized [64, 128, 64] to [a, c, b] (i.e., swapping b dimension and c dimension). In such cases, there is no large block of sequentially stored data to fetch, potentially reducing throughput to as low as 1 byte per cycle if the inner dimensions are swapped, which represents a massive drop in efficiency.

FIG. 1B illustrates the above-described worst-case scenario using a 3×3 tensor 110, in which the height axis (H), the width axis (W), and the channel axis (C) are equal in size, and the channel dimension is typically the outermost, and the width dimension is the innermost, though the height could be innermost with similar outcomes. In practical applications, the channel dimension (C) is usually divided into a plurality of channel groups. Each channel group includes multiple contiguous channels, and denoted as channel group dimension. For example, there could be 128 channels, and every 16 channels are grouped together as a channel group. Usually, the channel group dimension is the inner-most dimension and the data within the same channel group is stored sequentially in memory. However, for simplicity, it is assumed that the channel group dimension is 1, therefore the W dimension becomes the inner-most dimension. The elements of tensor 110 are labeled to aid in explaining the transposition process and memory storage.

Commonly in existing technology, tensors are stored in memory 120 with the innermost dimension stored continuously first, followed by the next most-inner dimension, and so forth. As depicted in FIG. 1B, the sequence (1, 2, 3) from the channel 0 and height 0 row is stored consecutively in memory 120, followed by (4, 5, 6), (7, 8, 9), and so on.

If the transposition of tensor 110 involves swapping the height and width axes, while keeping the channel axis unchanged, the elements in channel 0 would be rearranged across its main diagonal post-transposition, as visualized in FIG. 1B.

During this transposition, assuming the system can read 3 bytes per cycle from memory, it would typically read data continuously from the initial memory address to fill the 3-byte capacity and then write this data to the designated memory location. In this case, during the first reading cycle, tensor data (1, 2, 3) is fetched using the 3 bytes/cycle bandwidth. However, from this data, only the first byte (1) is effectively fetched because only (1) is needed for the first row of the target tensor after transposition, rendering the remaining bytes (2, 3) unnecessary. Similarly, in subsequent cycles, only one byte per cycle is effectively used, such as (4) from the next set, making the memory bandwidth utilization efficiency only one-third, or 33%.

The inventors of this application identified that the primary reason for the above inefficiency arises from the row-based tensor read from the source memory and row-based tensor write to the target memory when handling both transposing and stationary axes in tensor transposition. To overcome such technical limitations, this disclosure introduces a tensor transpose processor equipped with an inner transpose engine that executes row-based tensor reads and column-based tensor writes for the transposing axes. Additionally, an address scheduler is included to manage the read and write operations of tensor data for the stationary axes.

Figure 2:
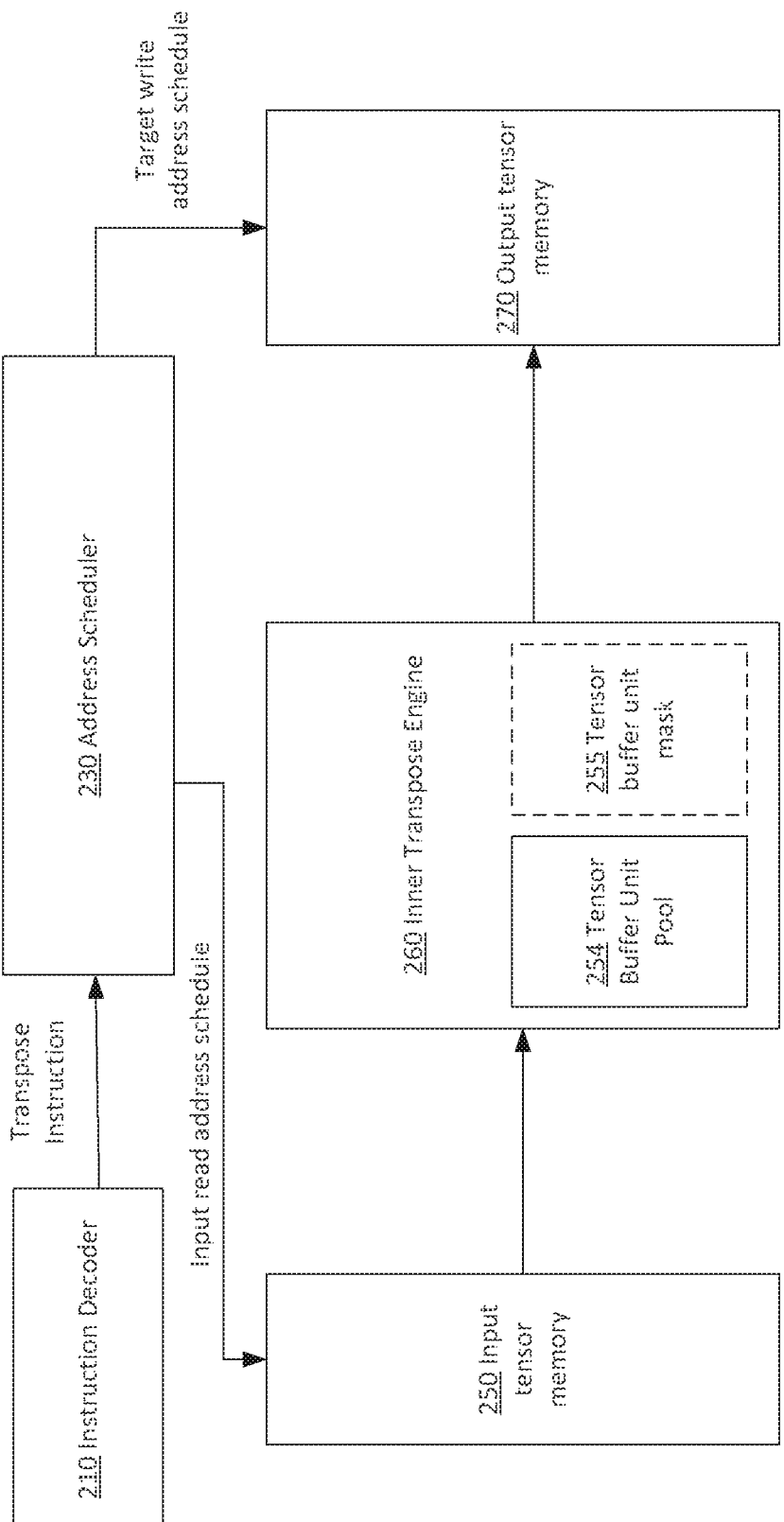
FIG. 2 illustrates an exemplary architectural diagram of a tensor transpose processor, in accordance with various embodiments.

FIG. 2 illustrates an exemplary architectural diagram of a tensor transpose processor (TTP), in accordance with various embodiments. The tensor transpose processor in FIG. 2 is simply used as an example to show the basic components for improving the memory efficiency for tensor transposition. Depending on the implementation, the TTP may include fewer, more, or alternative components.

In some embodiments, the TTP may include an instruction decoder for decoding tensor transpose instructions. The tensor transpose instruction may be received from machine learning computation algorithm, e.g., a convolution layer in deep neural networks. Each tensor transpose instruction may cause an input tensor to be transposed into a target tensor. The input tensor may include a plurality of axes (dimensions) and stored in an input tensor memory 250. The tensor transpose instruction may indicate the transposing axes and the stationary axes among the plurality of axes. The transposing axes may include two or more axes being transposed, and the stationary axes may include axes in the plurality of axes other than the transposing axes. Note that even the tensor data in the stationary axes are unchanged from a logic perspective, the actual memory storage locations for these tensor data may change during the transposition (e.g., when the stationary dimension is sandwiched by the transposing axes, the product of the sizes of all inner dimensions inside the stationary dimension is changed after the transposition).

In some embodiments, the TTP may further include an inner transpose engine 260 providing a pool 254 of tensor buffer units. These buffer units may be preconfigured to accommodate tensors of various sizes and serve as intermediate staging areas within the TTP for carrying out internal tensor transpositions before the final transposed tensor is produced. This configuration contrasts with existing methods where the input tensor is directly transposed from the input tensor memory and written into the output tensor memory. Instead, the TTP utilizes these internal buffer units to conduct in-buffer transpositions of sub-tensors extracted from the input tensor. Once these buffer units are filled, the intermediate transposition results are then transferred to the output tensor memory, significantly enhancing the efficiency of memory read/write bandwidth utilization.

In some embodiments, even though the sizes of the tensor buffer units may be pre-determined to accommodate the most popular tensor sizes, the pool 254 of tensor buffer units can be dynamically allocated to manage incoming tensor transpose instructions. This dynamic allocation allows for a seamless handling of operations: when a tensor buffer unit is occupied by a first tensor transpose instruction, subsequent requests for the same tensor buffer unit size do not need to await its release. Instead, an additional tensor buffer unit of identical size can be dynamically allocated using standard memory allocation interfaces, ensuring continuous processing without delay.

In some embodiments, the sizes of the tensor buffer units may be determined based on the maximum bandwidth of the tensor memory, e.g., the input tensor memory 250. For instance, assuming the maximum memory bandwidth is 512 bytes per reading cycle, the tensor buffer units may include two or more of the following sizes [8, 8, 64], [16, 16, 32], [32, 32, 16], [4, 4, 128], [2, 2, 256], and [1,1,512]. Here, the first two dimension represent the two outer-dimensions and the last dimension represent the most-inner dimension, such as in a typical HWCg (Height, Width, Channel Group).

In some embodiments, the product of two most-inner axes of tensor buffer units is equal to the maximum memory bandwidth, e.g., 512 in this example. This design is intended to read multiple sections of the continuously stored tensor data using the maximum memory bandwidth.

In some embodiments, each of the plurality of tensor buffer units includes a first axis, a second axis, and a third axis. The first axis equals to the second axis, and the third axis represents a dimension (e.g., a channel group dimension) that is smaller than a maximum memory bandwidth of the input tensor memory.

When the inner transpose engine 260 is instructed to transpose the input tensor (stored in the input tensor memory 250), it may first select a suitable tensor buffer unit to activate. The selection of the tensor buffer may be based on the size of the inner-most dimension of input tensor.

Using a commonly used Gc*H*W*Cg(Group of channel dimension, Height dimension, Width dimension, and channel group dimension) tensor as an example, the inner-most dimension is channel group dimension. Each channel group may be considered as a subsection of the channel dimension. Each channel group includes a plurality of channels, and tensor data within each channel group is stored sequentially in the input tensor memory. In this case, the selection of the suitable tensor buffer unit in the inner transpose engine 260 for activation may be based on the size of the channel group of the input tensor. That is, the tensor buffer unit being selected and activated may have a most-inner dimension of the same size as the size of the channel group of the input tensor.

After the selected tensor buffer unit is being activated, tensor data from the transposing axes of the input tensor are read row-wise from the input tensor memory 250 and are then written column-wise into the tensor buffer unit. This setup allows for the transposition of the tensor data from the transposing axes to occur directly within the tensor buffer unit, with all transposition activities confined to this buffer. When the tensor buffer unit becomes fully populated, the transposed tensor data are then directly transferred to the output tensor memory 270 without requiring any additional transposition steps.

Figure 3A:
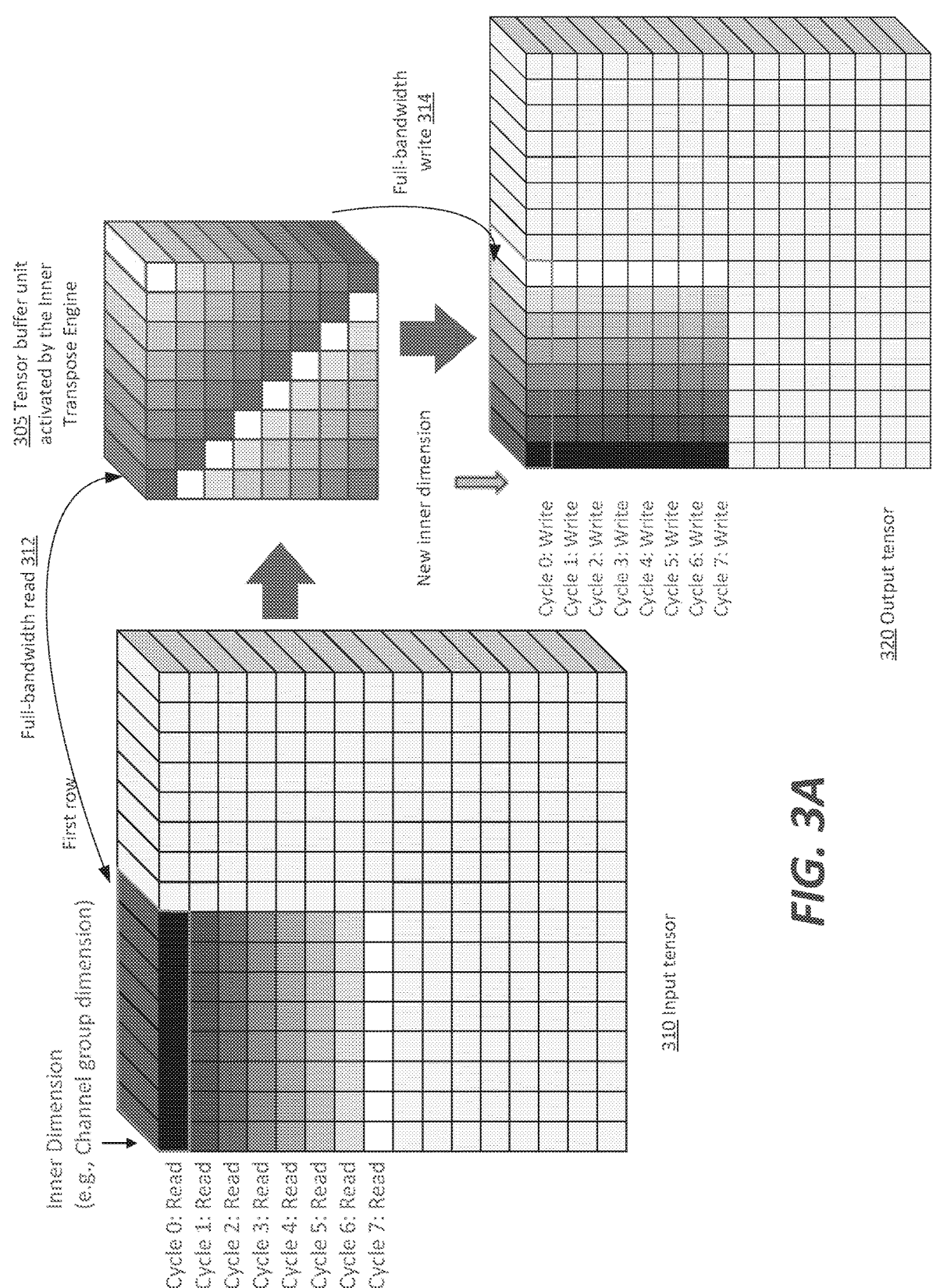
FIG. 3A illustrates an exemplary tensor transposition using the tensor transpose processor, in accordance with various embodiments.

The process of populating the tensor buffer unit requires several read cycles, with the number of these cycles dependent on the outermost dimension of the unit. Each read cycle involves the continuous read of tensor data from the input tensor memory 250, utilizing the full memory bandwidth, which matches the product of the two innermost dimensions of the tensor buffer unit (an example is shown in FIG. 3A).

Similarly, when the transposed tensor data are to be transferred from the tensor buffer unit to the output tensor memory 270, an equivalent number of write cycles are conducted. Each write cycle consists of transferring a plane of tensor data from the buffer unit to the output memory, also using the full memory bandwidth.

By this method, both reading from and writing to memory are optimized to fully utilize the available memory bandwidth, thereby enhancing the efficiency of memory access throughout the transposition process.

In certain use cases, it is possible that the input tensor may have a non-standard channel group size, resulting in a scenario where none of the tensor buffer units are perfectly suited for performing the inner transposition. To address this issue, in some embodiments, the inner transpose engine 260 may further includes a tensor buffer unit mask 255. This tensor buffer unit mask 255 may be configured to mask off part of a tensor buffer unit when the input tensor has a size that does not match with any of the tensor buffer units in the pool 254. That is, the tensor buffer unit mask 255 may be used to dynamically create a "suitable" tensor buffer unit. More details about this tensor mask are described in FIG. 4.

In some embodiments, the inner transpose engine 260 is configured to handle the transposing axes of the input tensor, i.e., the tensor data from the axes that are being transposed. To handle the tensor data movement from the stationary axes of the input tensor, the TTP may further include an address scheduler 230 configured to compute the target memory addresses for these tensor data from the stationary axes. This scheduler 230 is responsible for calculating the target memory addresses for the tensor data associated with the stationary axes. Given that the tensor structures before and after transposition are defined upon decoding the tensor transposition instruction, the process involves computing both the source and target memory addresses for the tensor data in the stationary axes, primarily through updates to the stride sizes.

In this disclosure, memory access (e.g., read/write) bandwidth of the input tensor memory 250 and the output tensor memory 270 refers to the capacity of a computing system to read from or write data to its memory within a single operational cycle, often measured in bytes per cycle. Essentially, this metric indicates the volume of data that can be efficiently transferred between the computer's memory and its processor within each clock cycle. The significance of memory bandwidth becomes particularly apparent in high-performance computing tasks, where the speed of reading from and writing to memory can greatly affect overall system performance.

FIG. 3A illustrates an exemplary tensor transposition using the tensor transpose processor (TTP), in accordance with various embodiments. This example is provided to aid in the understanding of the TTP and the transposition process outlined in FIG. 2.

As shown, the input tensor 310 includes a height dimension, a width dimension, and a channel group dimension. With the channel group dimension being the inner-most dimension, the tensor data on the channel group dimension is stored continuously in the memory.

To transpose the input tensor 310 using the TTP, a suitable tensor buffer unit 305 may be activated by the Inner Transpose Engine (e.g., 260 in FIG. 2) of the TTP. The selection of the suitable tensor buffer unit 305 may be based on the size of the channel group dimension of the input tensor 310. In this particular example, the size of the channel group dimension of the input tensor 310 is the same as the inner-most dimension of the tensor buffer unit 305.

Using the TTP to transpose the input tensor 310 may involve multiple rounds, each round including an inner transposition of a subtensor in the input tensor. Each of the subtensor being transposed during each round may have the same size of the activated tensor buffer unit 305.

Within each round of transposition, multiple read cycles may be performed to fully utilize the memory read bandwidth and the buffer size of the tensor buffer unit 305. For example, in FIG. 3A, the tensor buffer unit 305, with dimensions of height and width both set at 8, requires eight reading cycles to become fully populated, with each cycle involving the reading of 8 times the channel group dimension of tensor data continuously stored in the input tensor memory.

In some embodiments, the reading of the tensor data from the input tensor memory is row-based (e.g., reading one row at once), and the writing of the tensor data into the tensor buffer unit 305 is column-based (e.g., writing a column at once). For instance, the first row of the subtensor of the input tensor 310 (i.e., the dark-highlighted portion of the first plane in the input tensor 310, assuming that the channel group dimension is considered as one unit) may be read all together (since they are continuously stored in the memory). Here, the subtensor has the same size of the first plane of the tensor buffer unit 305.

Each read cycle involves reading continuously stored tensor data equal to the product of the channel group dimension and the width dimension of the tensor buffer unit 305. This configuration is set to match the maximum memory bandwidth, ensuring that each read cycle, denoted as "full bandwidth read 312"in FIG. 3A, fully utilizes the available memory bandwidth.

After reading a row of tensor data, it is written as a column in a shifting manner into the tensor buffer unit 305. As depicted in FIG. 3A, the first read row from input tensor 310 is written in the column direction but across all columns in tensor buffer unit 305. Once the tensor buffer unit 305 is fully populated after eight read cycles, the tensor data within has already been transposed. Then this transposed data is then transferred to the output tensor 320 over eight write cycles.

During each write cycle, each row of tensor data are read from the tensor buffer unit 305, and written all together in the row direction but in a shifting manner into the output tensor 320. Note that all the tensor data in the same row is already transposed, they can be written continuously in the output tensor. However, since the rows in the tensor buffer unit 305 were shifted during the loading process (e.g., from the internal memory to the tensor buffer unit 305), the writing of the transposed rows from the tensor buffer unit 305 into the output tensor 320 need to shift it back. A simplified example is illustrated in FIG. 3B.

Figure 3B:
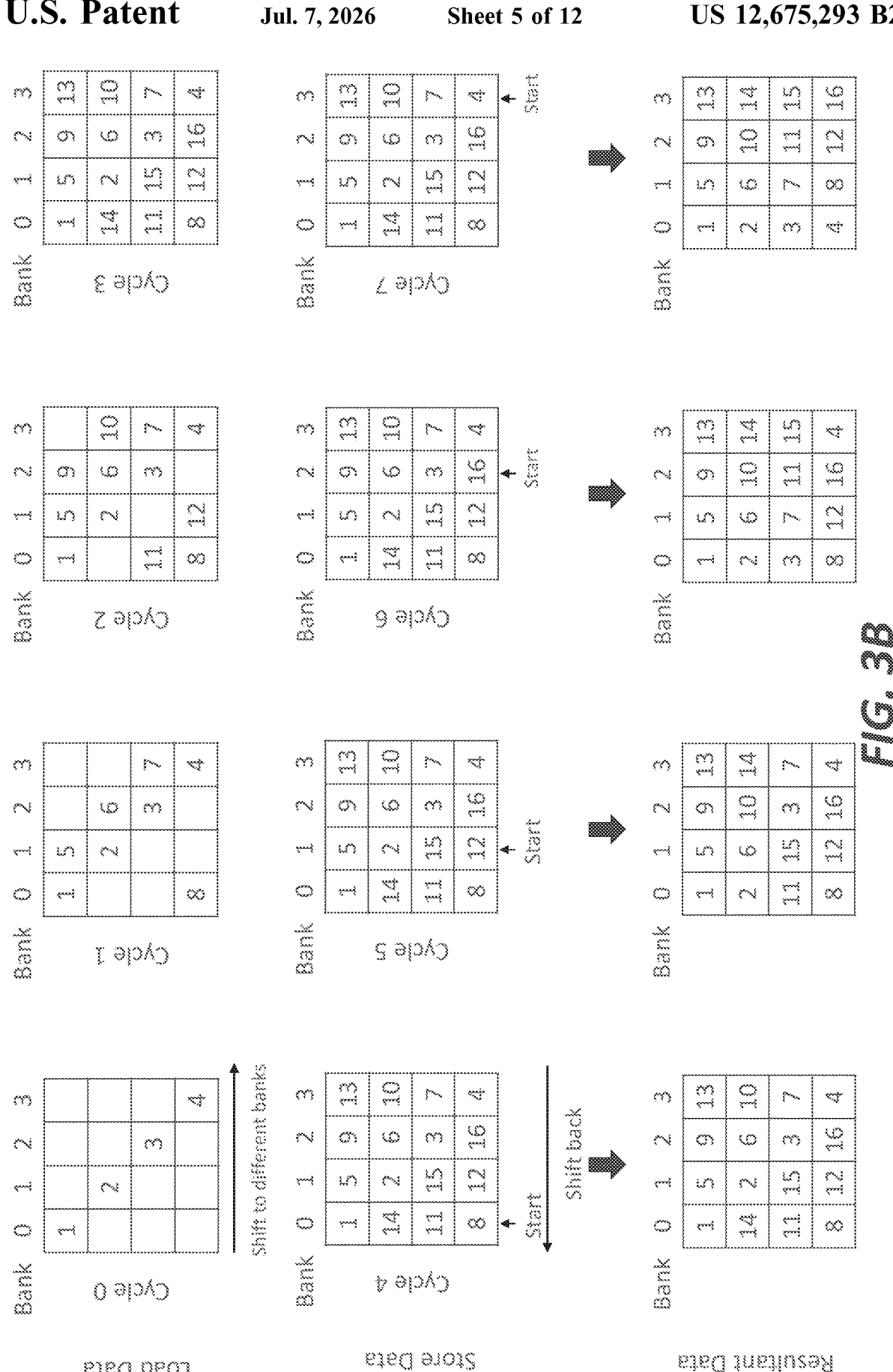
FIG. 3B illustrates an example loading and storing process to achieve the internal transposition in the tensor transpose processor, in accordance with various embodiments.

FIG. 3B illustrates an example loading and storing process to achieve the internal transposition in the tensor transpose processor, in accordance with various embodiments.

The term "bank" used in FIG. 3B refers to a distinct section or subdivision of the memory array in the context of SRAM. An SRAM can be divided into multiple banks to enhance parallelism and access speed. Each bank can be accessed independently, allowing for simultaneous read or write operations in different banks. In FIG. 3B, each column is represented as a bank for illustrative purposes. A person skilled in the art would understand how to apply the same process by treating each row as a bank.

To achieve high-bandwidth transpose operations, the internal transposition process (i.e., the load-and-store process) needs to ensure that the input data resides in different banks and that the output data also resides in different banks. This is accomplished by the "shifting"operations.

As shown, during the "load data" phase, cycle 0 includes reading a row of tensor data (1,2,3,4) and writing them into the internal buffer unit in the column direction and in a shifting manner across all the banks: the tensor data (1) is stored in bank 0, the tensor data (2) is stored in bank 1, the tensor data (3) is stored in bank 2, and the tensor data (4) is stored in bank 3. During cycle 1, the same process repeats for the next row of tensor data (5, 6, 7, 8), in which the tensor data (5) is stored in bank 1, the tensor data (6) is stored in bank 2, the tensor data (7) is stored in bank 3, and the tensor data (8) is stored in bank 0. The process continues to finish all four rows.

As shown, each row of tensor data from the input tensor is spread out into all the banks (to maximize parallelism), and the starting bank for loading each row is right shifted. After the "load data" phase, each row of the internal tensor buffer stores is already transposed. However, different rows of the internal tensor buffer are shifted during the loading process, so the rows need to be shifted back for alignment such that the resultant tensor is fully transposed and aligned.

In particular, during the "store data" phase, each cycle includes writing a row of tensor data from the internal tensor buffer to the output tensor. During $(i+1)_{th}$ cycle, the $(i+1)_{th}$ row from the internal tensor buffer is written into the $(i+1)_{th}$ row of the output tensor, but the starting bank in the $(i+1)_{th}$ cycle is right shifted from the starting bank in the $(i)_{th}$ cycle. As shown in FIG. 3B, cycle 4 includes writing the first tensor data to bank 0, and cycle 5 includes writing the first tensor data to bank 1. The "resultant data" in FIG. 3 shows that, after the shifted-loading process and the shifted-storing process, the input tensor is internally transposed and stored as the output tensor.

In conclusion, the multiple read cycles from the input tensor memory and the multiple write cycles into the output tensor memory are designed to make full use of the maximum memory bandwidth, facilitated by the specifically configured sizes of tensor buffer unit.

Figure 4:
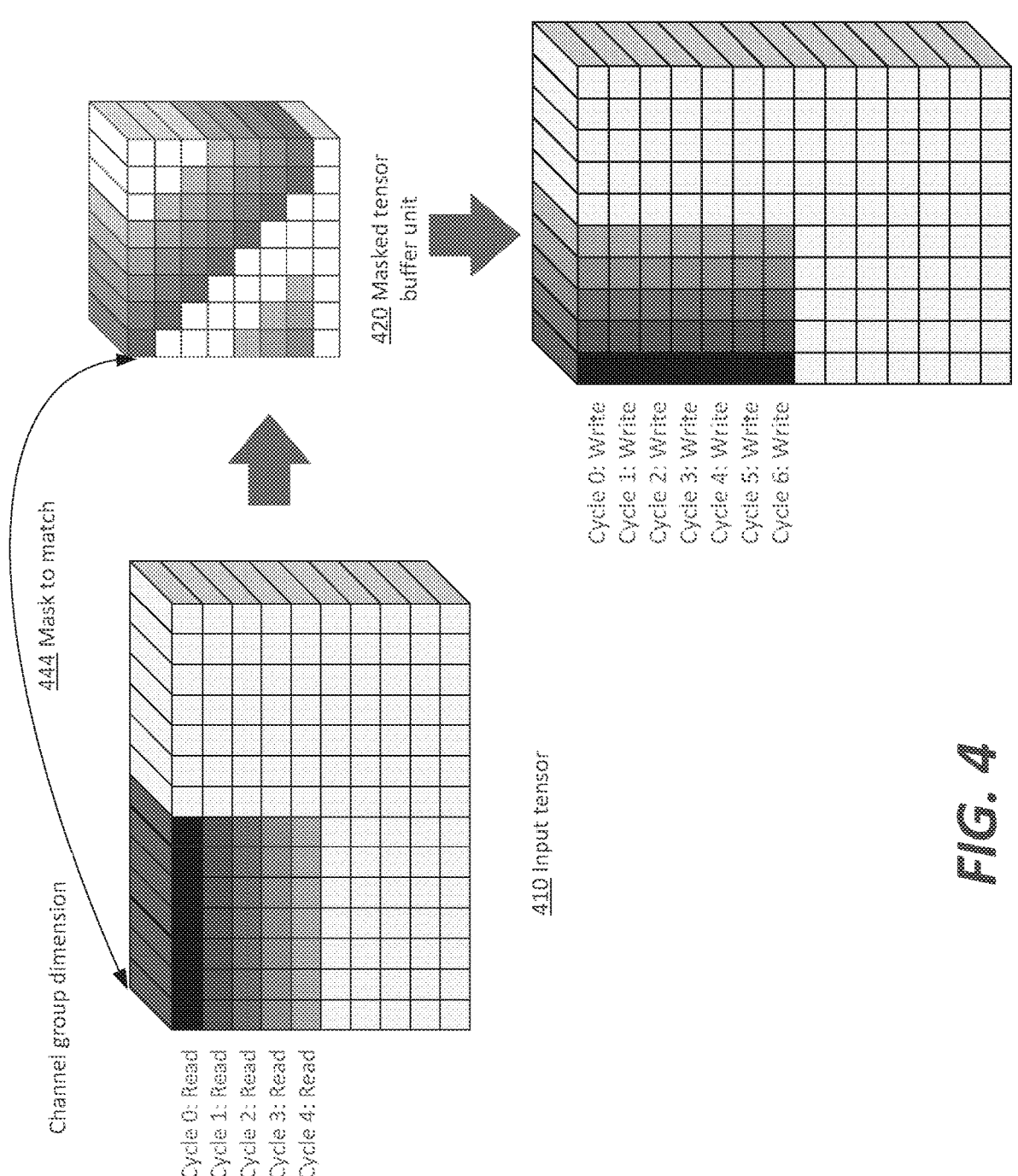
FIG. 4 illustrates another exemplary tensor transposition using the tensor transpose processor, in accordance with various embodiments.

FIG. 4 illustrates another exemplary tensor transposition using the tensor transpose processor (TTP), in accordance with various embodiments. In some embodiments, the preconfigured tensor buffer units in the TTP are to accommodate the standard tensor sizes (more specifically, the standard channel group sizes). However, when the input tensor 410 has an irregulate channel group size, there is no organic tensor buffer units to match with the input tensor 410.

In some embodiments, if none of the organic tensor buffer units have an inner-most (i.e., the channel group) dimension that matches the size of the channel group of the input tensor 410, an approximate tensor buffer unit might be selected to carry out the inner transposition within the TTP. This selected approximate tensor buffer unit would have the smallest inner-most dimension that exceeds the size of the channel group of the input tensor 410.

After selecting the approximate tensor buffer unit, tensor masks may be applied to the approximate tensor buffer unit to obtain a masked tensor buffer unit 420, such that the masked tensor buffer unit 420 has the inner-most dimension of the same size as the size of the channel group dimension of the input tensor 410 (denoted as "mask to match" 444 in FIG. 4).

Using the masked tensor buffer unit 420, the multi-cycle reads from the input tensor and the multi-cycle writes into the output tensor may performed just as the way described in FIG. 3A. Even though the approximate tensor buffer unit has some buffer spaces masked out and thus not fully utilized, the product of the (channel group dimension)* (width dimension) of the masked tensor buffer unit 420 may still be configured as the maximum memory bandwidth. This way, each read cycle and write cycle may still fully utilize the memory bandwidth.

Figure 5A:
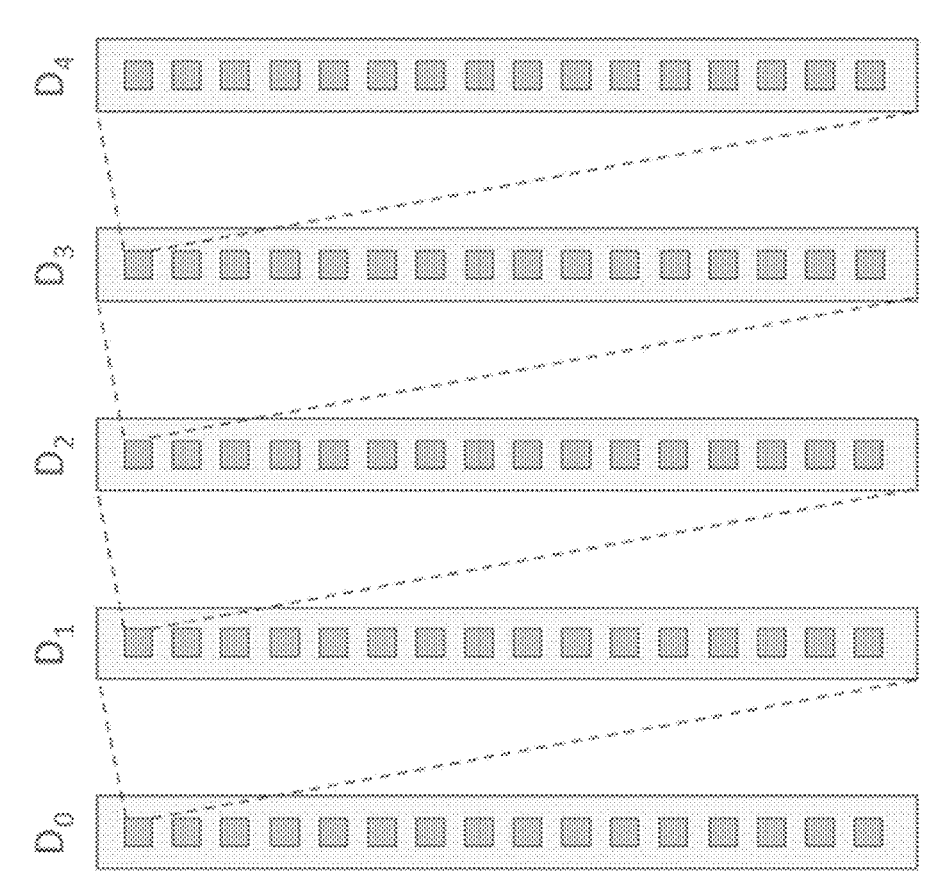
FIG. 5A illustrates an example high dimension tensor representation, facilitating the descriptions of FIGS. 5B to 5D.
Figure 5B:
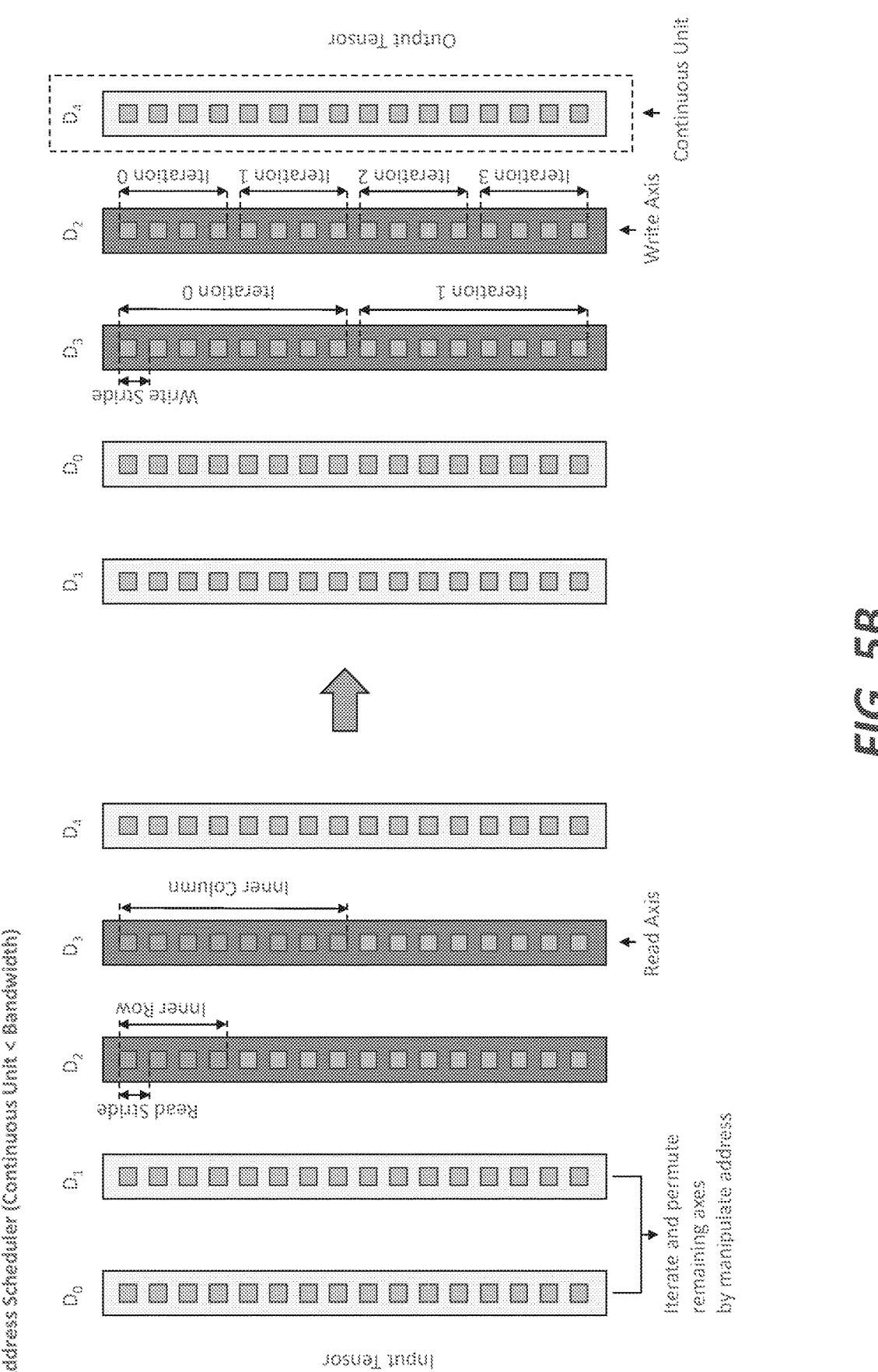
FIG. 5B illustrates an exemplary tensor transposition using the tensor transpose processor when the continuous unit of the tensor is smaller than the memory bandwidth, in accordance with various embodiments.
Figure 5C:
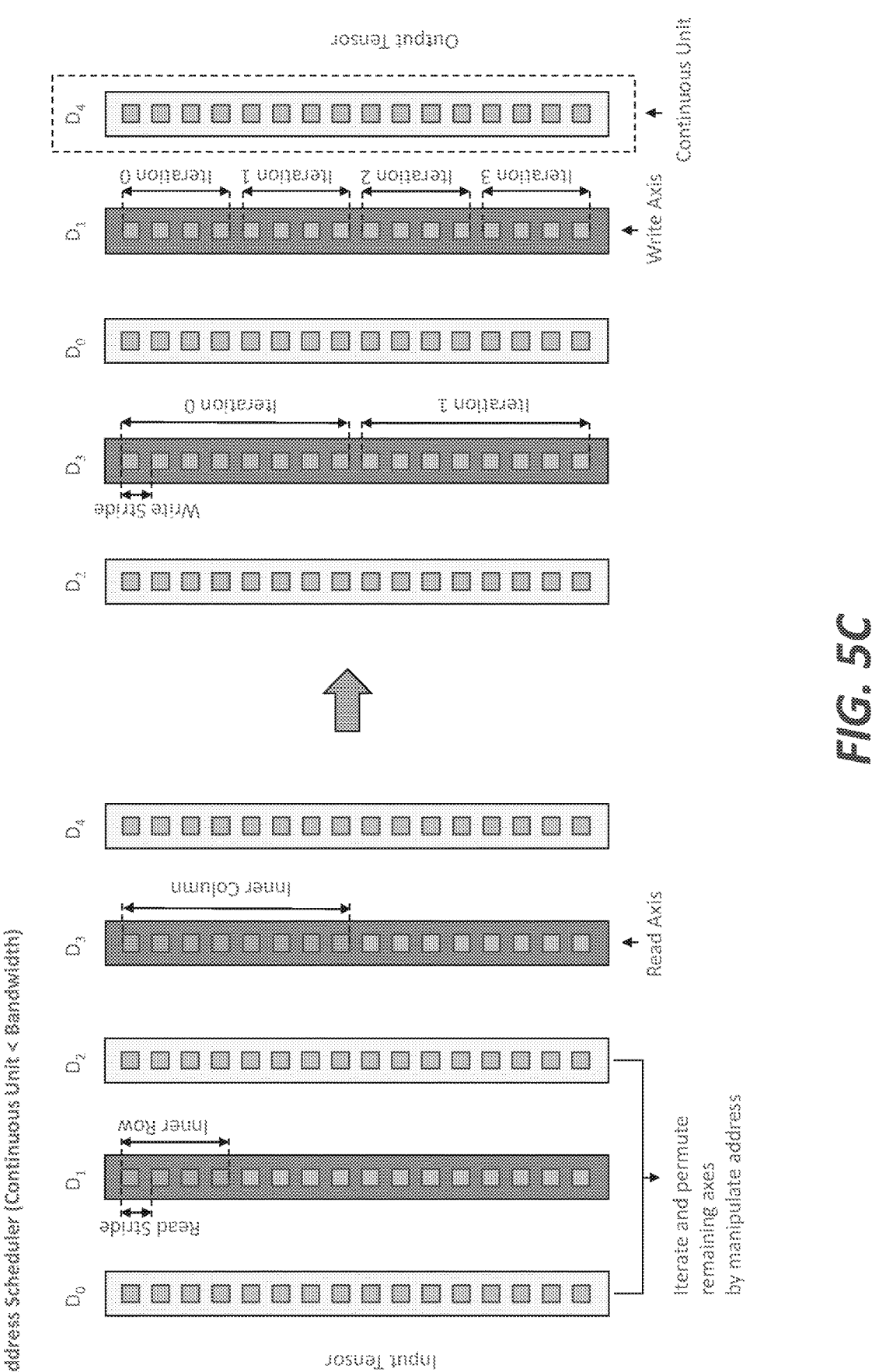
FIG. 5C illustrates another exemplary tensor transposition using the tensor transpose processor when the continuous unit of the tensor is smaller than the memory bandwidth, in accordance with various embodiments.
Figure 5D:
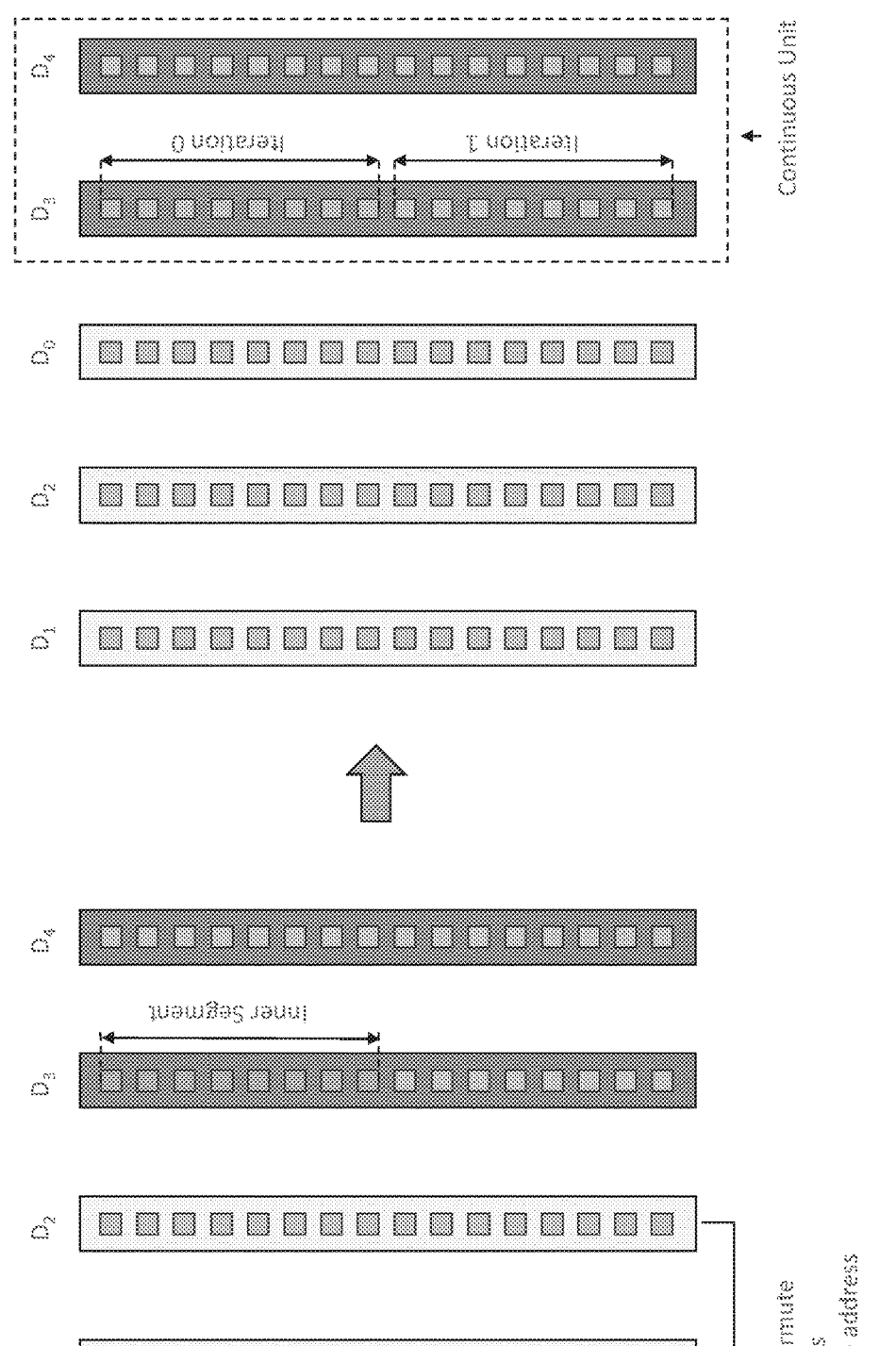
FIG. 5D illustrates an exemplary tensor transposition using the tensor transpose processor when the continuous unit of the tensor is equal to or greater than the memory bandwidth, in accordance with various embodiments.

FIG. 5A illustrates an example of a high-dimensional tensor representation, providing a foundation for the descriptions in FIGS. 5B to 5D. While low-dimensional tensors can be represented as vectors or matrices, high-dimensional tensor representations are often less intuitive. To simplify, FIG. 5A (and the subsequent FIGS. 5B-5D) employs a straightforward method to represent a 5-dimensional tensor, where each small square symbolizes nested data of the subsequent dimension. This representation method effectively uses a tree structure to depict the high-dimensional tensor.

FIG. 5B illustrates an exemplary tensor transposition using the tensor transpose processor when the continuous unit of the tensor is smaller than the memory bandwidth, in accordance with various embodiments. Since the continuous unit of the tensor is smaller than the memory bandwidth, multiple continuous units may be read during the same iteration to fully utilize the memory bandwidth.

In FIG. 5B, the "continuous unit" refers to the continuous data within the tensor that is continuously stored in the memory. In general, the inner-most dimension of the tensor is continuously stored (e.g., D4 dimension in FIG. 5B), but the continuous unit may include more than one rounds of the inner-most dimension of the tensor.

In particular, the source tensor on the left part of FIG. 5B $(D_0 D_1 D_2 D_3 D_4)$ is being transposed into the destination tensor $(D_1 D_0 D_3 D_2 D_4)$ on the right part of FIG. 5B. The transposing axes are $D_2$ and $D_3$, and the other axes ($D_0$ and $D_1$) are stationary, D4 is the continuous unit. The continuous unit D4 is smaller than the memory bandwidth.

In this case, the transposition involves using a selected tensor buffer unit to read multiple "inner column" from the $D_3$ of the source tensor. The number of continuous "inner columns" being read is determined by the "read stride" in the $D_2$ dimension (i.e., the dimension right before the $D_3$ of the input tensor). The product of the "read stride" and the "inner column" is equal to the memory bandwidth.

During the write cycles, multiple "inner column" are read from the tensor buffer unit and written into the output buffer.

The number of "inner column" being read from the tensor buffer is determined by the "write stride" in the new $D_3$ dimension (i.e., the dimension right before the inner-most dimension $D_2$ of the transposed tensor). The product of the "write stride" and the "write iteration" (e.g., write iteration 0 and write iteration 1 in the new $D_3$ dimension) is equal to the memory bandwidth.

During this process, the dimensions $D_0$ and $D_1$ in the input tensor do not go through the inner transposition using the inner transpose engine. Instead, the permutation of these two dimensions are performed by the address scheduler manipulating the memory addresses.

FIG. 5C illustrates another exemplary tensor transposition using the tensor transpose processor when the continuous unit of the tensor is smaller than the memory bandwidth, in accordance with various embodiments. The example in FIG. 5C involves transposing (swapping) non-contiguous dimensions $D_1$ and $D_3$ in the input tensor. Again, the continuous unit is the dimension $D_4$. In the input tensor, the read stride in the $D_1$ dimension times the "inner column" would equal to the memory bandwidth. Similarly, in the output (transposed) tensor, the write stride in the $D_3$ dimension times the "write iteration" (e.g., write iteration 0 and write iteration 1 in the new $D_3$ dimension) is equal to the memory bandwidth.

During this process, the dimensions $D_0$ and $D_2$ in the input tensor do not go through the inner transposition using the inner transpose engine. Instead, the permutation of these two dimensions are performed by the address scheduler manipulating the memory addresses.

FIG. 5D illustrates an exemplary tensor transposition using the tensor transpose processor when the continuous unit of the tensor is equal to or greater than the memory bandwidth, in accordance with various embodiments. When the continuous unit is equal to or greater than the memory bandwidth, the memory bandwidth would be fully utilized in every read cycle and writhe cycle.

During this process, the dimensions $D_0$, $D_1$, and $D_2$ in the input tensor do not go through the inner transposition using the inner transpose engine. Instead, the permutation of these three dimensions are performed by the address scheduler manipulating the memory addresses.

FIG. 6 illustrates an exemplary method 600 of tensor transposition using the tensor transpose processor, in accordance with various embodiments. In some implementations, one or more process blocks of FIG. 6 may be performed by a tensor transpose processor.

As shown in FIG. 6, process 600 may include decoding a tensor transpose instruction for transposing an input tensor stored in an input tensor memory, where the input tensor may include a plurality of axes, and the tensor transpose instruction indicates transposing axes and stationary axes of the plurality of axes, where the transposing axes may include two or more axes being transposed, and the stationary axes may include one or more axes that are not being transposed (block 610). For example, the tensor transpose processor may decode a tensor transpose instruction for transposing an input tensor stored in an input tensor memory, where the input tensor may include a plurality of axes, and the tensor transpose instruction indicates transposing axes and stationary axes of the plurality of axes, where the transposing axes may include two or more axes being transposed, and the stationary axes may include one or more axes that are not being transposed, as described above.

As also shown in FIG. 6, process 600 may include activating a tensor buffer unit for transpose the input tensor, where the tensor buffer unit is selected from a plurality of tensor buffer units of different sizes (block 620). For example, the tensor transpose processor may activate a tensor buffer unit for transpose the input tensor, where the tensor buffer unit is selected from a plurality of tensor buffer units of different sizes, as described above.

As further shown in FIG. 6, process 600 may include reading tensor data in the transposing axes of the input tensor from the input tensor memory by rows (block 630). For example, the tensor transpose processor may read tensor data in the transposing axes of the input tensor from the input tensor memory by rows, as described above.

As also shown in FIG. 6, process 600 may include writing the tensor data into the tensor buffer unit by columns (block 640). For example, the tensor transpose processor may write the tensor data into the tensor buffer unit by columns, as described above. As further shown in FIG. 6, process 600 may include in response to the tensor buffer unit is full, copy the tensor data from the tensor buffer unit into an output tensor memory (block 650). For example, the tensor transpose processor may in response to the tensor buffer unit is full, copy the tensor data from the tensor buffer unit into an output tensor memory, as described above.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
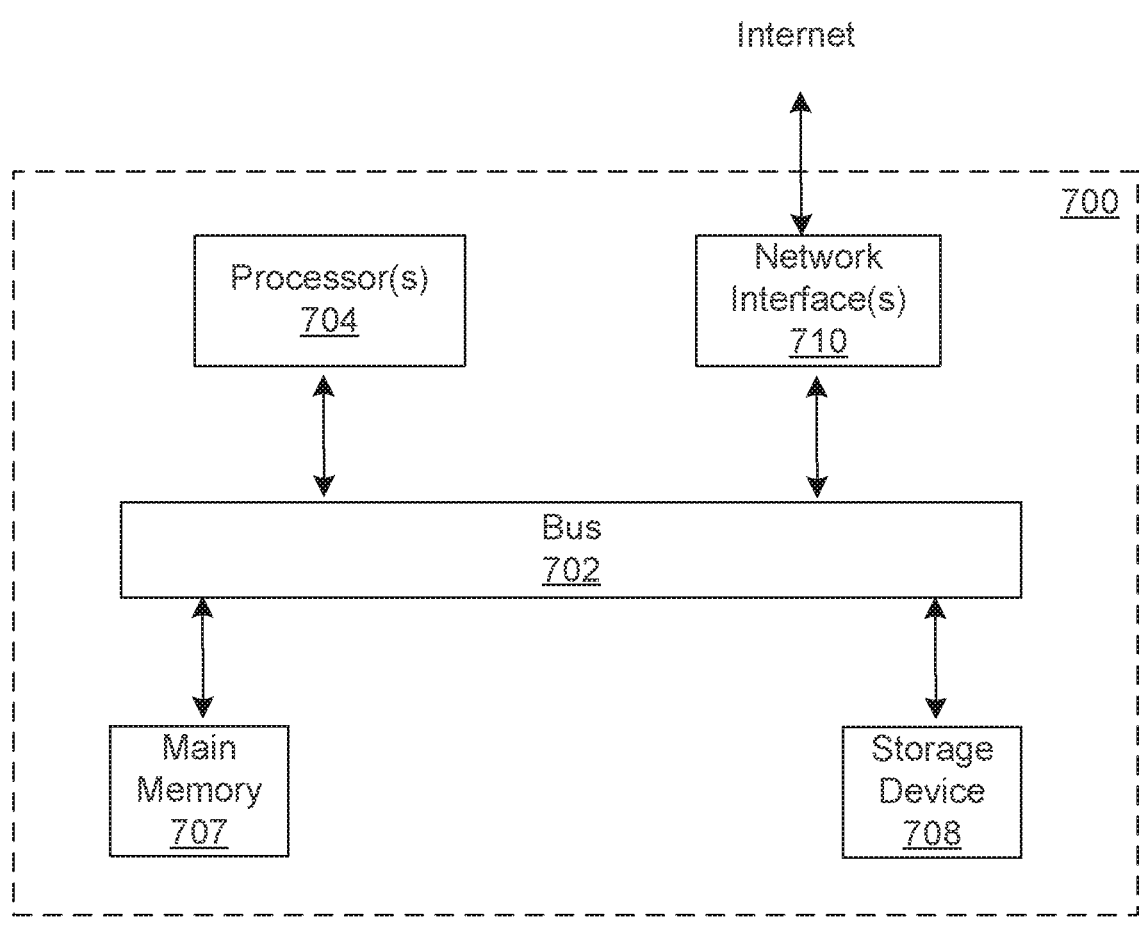
FIG. 7 illustrates an example computer system in which any of the embodiments described herein may be implemented.

FIG. 7 illustrates an example computing device in which any of the embodiments described herein may be implemented. The computing device may be used to implement one or more components of the systems and the methods shown in FIGS. 1-6. The computing device 700 may comprise a bus 702 or other communication mechanisms for communicating information and one or more hardware processors 704 coupled with bus 702 for processing information. Hardware processor(s) 704 may be, for example, one or more general-purpose microprocessors.

The computing device 700 may also include a main memory 707, such as random-access memory (RAM), cache and/or other dynamic storage devices, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 708. Execution of the sequences of instructions contained in main memory 707 may cause processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hard-wired circuit may be used in place of or in combination with software instructions.

The computing device 700 also includes a communication interface 710 coupled to bus 702. Communication interface 710 may provide a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training samples to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A processor for optimizing memory bandwidth utilization during tensor transpositions in machine learning, comprising:
an instruction decoder configured to decode a tensor transpose instruction for transposing an input tensor stored in an input tensor memory, wherein:
the input tensor comprises a plurality of axes, and
the tensor transpose instruction indicates transposing axes and stationary axes of the plurality of axes, wherein the transposing axes comprise two or more axes being transposed, and the stationary axes comprise one or more axes that are not being transposed;
an inner transpose engine configured to:
provide a plurality of tensor buffer units of different sizes;
activate a tensor buffer unit of the plurality of tensor buffer units;
read tensor data in the transposing axes of the input tensor from the input tensor memory by rows;
write the tensor data into the activated tensor buffer unit by columns; and
in response to the activated tensor buffer unit being full, copy the tensor data from the activated tensor buffer unit into an output tensor memory; and
an address scheduler configured to:
determine target memory addresses in the output tensor memory for writing tensor data from the stationary axes of the input tensor into the output tensor memory.

2. The processor of claim 1, wherein the input tensor is segmented into a plurality of sub-tensors based on the activated tensor buffer unit, and each of the sub-tensors has a same size as the activated tensor buffer unit.

3. The processor of claim 1, wherein:
the input tensor comprises a channel dimension divided into a plurality of channel groups, each channel group comprising a plurality of channels, wherein a number of the plurality of channels in the channel group is referred to as a size of the channel group of the input tensor, and tensor data in each channel group is stored sequentially in the input tensor memory.

4. The processor of claim 3, wherein to activate the tensor buffer unit of the plurality of tensor buffer units, the inner transpose engine is further configured to:
select one tensor buffer unit based on the size of the channel group of the input tensor, wherein the selected tensor buffer unit has a most-inner dimension of a same size as the size of the channel group of the input tensor; and
activate the selected tensor buffer unit.

5. The processor of claim 4, wherein to activate the tensor buffer unit of the plurality of tensor buffer units, the inner transpose engine is further configured to:
in response to none of the plurality of tensor buffer units having an inner-most dimension matching the size of the channel group of the input tensor, select an approximate tensor buffer unit that has a smallest inner-most dimension that is greater than the size of the channel group of the input tensor.

6. The processor of claim 5, wherein to activate the tensor buffer unit of the plurality of tensor buffer units, the inner transpose engine is further configured to:
apply tensor masks to the approximate tensor buffer unit to obtain a masked tensor buffer unit, such that the masked tensor buffer unit has the inner-most dimension of the same size as the size of the channel group of the input tensor; and
activate the masked tensor buffer unit.

7. The processor of claim 1, wherein the input tensor memory has a maximum memory bandwidth, and
each of the plurality of tensor buffer units comprises a plurality of tensor buffer axes, and a product of two most-inner axes of the plurality of tensor buffer axes is equal to the maximum memory bandwidth of the input tensor memory.

8. The processor of claim 1, wherein:
each of the plurality of tensor buffer units comprises a first axis, a second axis, and a third axis, wherein the first axis is equal to the second axis, and the third axis represents a channel group dimension that is smaller than a maximum memory bandwidth of the input tensor memory.

9. The processor of claim 1, wherein to read the tensor data from the transposing axes of the input tensor from the input tensor memory by rows, the inner transpose engine is further configured to:
determine a continuous unit in the input tensor for transposing, wherein the continuous unit comprises a longest vector of tensor data that is sequentially stored in the input tensor memory.

10. The processor of claim 9, wherein the input tensor memory has a maximum memory bandwidth, and
to read the tensor data from the transposing axes of the input tensor from the input tensor memory by rows and write the tensor data into the activated tensor buffer unit by columns, the inner transpose engine is further configured to:
read a first plurality of continuous units in a row of the input tensor to fulfill the maximum memory bandwidth of the input tensor memory;
write the first plurality of continuous units from the row of the input tensor into a column of the activated tensor buffer unit;
move to a next row of the input tensor and read a second plurality of continuous units in the next row to fulfill the maximum memory bandwidth of the input tensor memory; and
write the second plurality of continuous units from the next row of the input tensor into a next column of the activated tensor buffer unit.

11. The processor of claim 10, wherein to copy the tensor data from the activated tensor buffer unit into the output tensor memory, the inner transpose engine is further configured to:
in response to the activated tensor buffer unit being full, start copying the tensor data from the activated tensor buffer unit into the output tensor memory without transposing.

12. A method for optimizing memory bandwidth utilization during tensor transpositions in machine learning, comprising:
decoding a tensor transpose instruction for transposing an input tensor stored in an input tensor memory, wherein the input tensor comprises a plurality of axes, and the tensor transpose instruction indicates transposing axes and stationary axes of the plurality of axes, wherein the transposing axes comprise two or more axes being transposed, and the stationary axes comprise one or more axes that are not being transposed;

activating a tensor buffer unit for transposing the input tensor, wherein the activated tensor buffer unit is selected from a plurality of tensor buffer units of different sizes;

reading tensor data in the transposing axes of the input tensor from the input tensor memory by rows;

writing the tensor data into the activated tensor buffer unit by columns; and in response to the activated tensor buffer unit being full, copying the tensor data from the activated tensor buffer unit into an output tensor memory.

13. The method of claim 12, further comprising:

determining target memory addresses in the output tensor memory for writing tensor data from the stationary axes of the input tensor into the output tensor memory.

14. The method of claim 12, wherein the input tensor is segmented into a plurality of sub-tensors based on the activated tensor buffer unit, and each of the sub-tensors has a same size as the activated tensor buffer unit.

15. The method of claim 12, wherein the input tensor comprises a channel dimension divided into a plurality of channel groups, each channel group comprising a plurality of channels, wherein a number of the plurality of channels in the channel group is referred to as a size of the channel group of the input tensor, and tensor data within each channel group is stored sequentially in the input tensor memory.

16. The method of claim 15, wherein the activating the tensor buffer unit for transposing the input tensor comprises:

selecting one tensor buffer unit based on the size of the channel group of the input tensor, wherein the selected tensor buffer unit has a most-inner dimension of a same size as the size of the channel group of the input tensor; and activating the selected tensor buffer unit.

17. The method of claim 16, wherein the selecting the one tensor buffer unit based on the size of the channel group of the input tensor comprises:

in response to none of the plurality of tensor buffer units having an inner-most dimension matching the size of the channel group of the input tensor, selecting an approximate tensor buffer unit that has a smallest inner-most dimension that is greater than the size of the channel group of the input tensor.

18. The method of claim 17, wherein the activating the tensor buffer unit for transposing the input tensor comprises:

applying tensor masks to the approximate tensor buffer unit to obtain a masked tensor buffer unit, such that the masked tensor buffer unit and the input tensor have a same channel group dimension.

19. The method of claim 12, wherein the input tensor memory has a maximum memory bandwidth, and each of the plurality of tensor buffer units comprises a plurality of tensor buffer axes, and a product of two most-inner axes of the plurality of tensor buffer axes equals to the maximum memory bandwidth of the input tensor memory.

20. The method of claim 12, wherein each of the plurality of tensor buffer units comprises a first axis, a second axis, and a third axis, wherein the first axis is equal to the second axis, and the third axis represents a channel group dimension that is smaller than a maximum memory bandwidth of the input tensor memory.

* * * * *